US009400210B2

(12) United States Patent
Sagan

(10) Patent No.: US 9,400,210 B2
(45) Date of Patent: Jul. 26, 2016

(54) SINGLE APERTURE COAXIAL THREE CHANNEL OPTICAL SYSTEM

(71) Applicant: BAE SYSTEMS INFORMATION AND ELECTRONIC SYSTEMS INTEGRATION INC., Nashua, NH (US)

(72) Inventor: Stephen F. Sagan, Lexington, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 383 days.

(21) Appl. No.: 13/947,130

(22) Filed: Jul. 22, 2013

(65) Prior Publication Data

US 2014/0021380 A1  Jan. 23, 2014

Related U.S. Application Data

(60) Provisional application No. 61/674,425, filed on Jul. 23, 2012.

(51) Int. Cl.
| | |
|---|---|
| *H01J 3/14* | (2006.01) |
| *G01J 1/02* | (2006.01) |
| *G01J 3/36* | (2006.01) |
| *G01J 3/02* | (2006.01) |
| *G02B 27/10* | (2006.01) |
| *G02B 17/02* | (2006.01) |
| *G02B 17/08* | (2006.01) |

(52) U.S. Cl.
CPC ............... *G01J 1/029* (2013.01); *G01J 3/0208* (2013.01); *G01J 3/36* (2013.01); *G02B 27/1013* (2013.01); *G02B 17/02* (2013.01); *G02B 17/08* (2013.01); *Y10T 29/49826* (2015.01)

(58) Field of Classification Search
CPC ....... G01C 11/02; G01C 11/025; G01J 1/029; G01J 3/36; G01J 3/0208; G02B 27/1006; G02B 27/1013; H04N 13/0214
USPC .............................. 250/216, 226, 339.11, 353
See application file for complete search history.

(56) References Cited

U.S. PATENT DOCUMENTS

| | | | |
|---|---|---|---|
| 5,004,331 A | 4/1991 | Haseltine et al. | |
| 5,276,321 A * | 1/1994 | Chang ................. | G01C 11/025 250/226 |
| 5,701,239 A | 12/1997 | Bjoerklund et al. | |
| 6,274,868 B1 | 8/2001 | Hall et al. | |

(Continued)

*Primary Examiner* — Georgia Y Epps
*Assistant Examiner* — Kevin Wyatt
(74) *Attorney, Agent, or Firm* — Prakash Nama; Global IP Services PLLC

(57) ABSTRACT

A single aperture three channel optical system is disclosed. In one embodiment, the optical system includes a front optical group and a back optical group that is disposed in substantially close proximity to the front optical group. Further, the optical system includes a first sensor, a second sensor, and a third sensor. The front optical group and the second optical group receives an object beam and splits into a reflected beam having first wavelengths and a transmitted beam of second wavelengths. Furthermore, the front optical group and the second optical group splits the reflected beam having first wavelengths into a transmitted beam having third wavelengths and a reflected beam having fourth wavelengths. The first sensor, the second sensor and the third sensor receive the transmitted beam of second wavelengths, transmitted beam of third wavelengths, and reflected beam of fourth wavelengths, respectively and produce the coaxial three channel images.

19 Claims, 3 Drawing Sheets

(56) References Cited

U.S. PATENT DOCUMENTS

| | | |
|---|---|---|
| 7,180,658 B2 | 2/2007 | Shafer et al. |
| 7,248,401 B2 | 7/2007 | Bryant |
| 7,280,273 B2 | 10/2007 | Tejada et al. |
| 2004/0021852 A1 | 2/2004 | DeFlumere |
| 2004/0119020 A1* | 6/2004 | Bodkin ................... G01J 3/02 250/353 |
| 2013/0321790 A1* | 12/2013 | Kirby ................. H04N 13/0239 356/3.14 |
| 2015/0043009 A1* | 2/2015 | Bridges ................... G01S 17/42 356/610 |
| 2015/0177496 A1* | 6/2015 | Marks ................ G02B 13/0065 348/335 |
| 2015/0268346 A1* | 9/2015 | Nakamura ............. G01S 17/66 356/5.04 |

* cited by examiner

SINGLE APERTURE COAXIAL THREE CHANNEL OPTICAL SYSTEM

CROSS-REFERENCE TO RELATED APPLICATIONS

This Application claims rights under 35 USC §119(e) from U.S. Application 61/674,425 filed Jul. 23, 2012, the contents of which are incorporated herein by reference.

BACKGROUND OF THE INVENTION

1. Field of the Invention

The present invention relates to an optical system and more particularly to a single aperture multichannel optical system.

2. Brief Description of Related Art

Optical sensors and detectors, including night vision systems, often use multiple imaging channels, each operating at a specified waveband. Such multiple imaging channels often use either multiple apertures or share a common aperture of an objective piece. However, multiple apertures may have limited boresight retention ability. Further, single aperture multiple imaging channels based optical systems use tilted planar dichoric beam splitters to separate imaging channels, which may introduce a number of optical distortions.

Furthermore, the need for compact visible-light images has led to extensive use of short focal length, small aperture lenses that meet the strict space and weight constraints required for many commercial and military applications. While these miniature refractive lenses often perform well in good lighting and within a small range of optical magnification, resolution and light collection are limited by the small aperture, focal length and physical track length of the lens. One method of significantly increasing focal length and magnification without a corresponding increase in track length consists of reflecting the optical path multiple times with concentric reflectors, thus constraining the optical propagation to occur within a thin optical element. However, with this approach, imaging in disparate spectral bands (for example, visible, laser and near infrared (IR)), seeing a laser designator spot, detecting a laser range finder return, and maximizing use of common elements with disparate sensors to minimize sources of boresight error while optimizing weight and volume can be a challenge.

SUMMARY OF THE INVENTION

An optical system and method for fabricating a single aperture coaxial three channel optical system are disclosed. According to one aspect of the present subject matter, the optical system includes a front optical group, which includes a source aperture, secondary mirror and a first beam splitter and corrector element. Further, the optical system includes a back optical group that is disposed in substantially close proximity to the front optical group. The back optical group includes a primary minor, tertiary minor and a second beam splitter and corrector element. Furthermore the optical system includes a first sensor that is disposed substantially close and to the left of the front optical group. In addition, the optical system includes a second sensor that is disposed substantially close and to the right of the back optical group. Also, the optical system includes a third sensor that is disposed in the first beam splitter and corrector element and in a shadow of optical path. The primary minor, the secondary mirror and the tertiary minor are configured to receive an object beam and focus the object beam on to the first beam splitter and corrector element. The first beam splitter and corrector element is configured to split the object beam into a reflected beam having first wavelengths and a transmitted beam of second wavelengths. The second beam splitter and corrector element is configured to receive and split the reflected beam having first wavelengths into a transmitted beam having third wavelengths and a reflected beam having fourth wavelengths. The first sensor, the second sensor and the third sensor are configured to receive the transmitted beam of second wavelengths, transmitted beam of third wavelengths, and reflected beam of fourth wavelengths, respectively and produce the coaxial three channel images.

Another example embodiment provides a method of making a single aperture coaxial three channel optical system for producing coaxial three channel images. In one example embodiment the method includes forming a front optical group including a secondary minor that is integral with a spider structure. The spider structure integrates and supports a multispectral window and a source aperture. A first beam splitter and corrector element is then assembled in the formed front optical group. A back optical group including a primary mirror that is integral with a tertiary minor is then formed. A second beam splitter and corrector element is then assembled in the formed back optical group. The front optical group is then disposed within a substantial proximity and a predetermined image metric to the back optical group. A first sensor is disposed onto the front optical group, a second sensor is disposed on to the back optical group and a third sensor is disposed onto the first beam splitter and corrector element such that they are within a predetermined boresight and image metric to receive a transmitted beam of second wavelengths, a transmitted beam of third wavelengths, and a reflected beam of fourth wavelengths, respectively, and to produce the coaxial three channel images.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE INVENTION

The exemplary embodiments described herein in detail for illustrative purposes are subject to many variations in structure and design.

The optical system described herein provides a completely co-axial optical system including three sensors sharing a common aperture. Further, the optical system provides a compact multifold catedotric (i.e., back and forth) optical system where the spectral bands are separated by beam splitters that are incorporated into a front optical group and a back optical group. Furthermore, the optical system includes two sensors that are disposed outside of the front optical group and the back optical group and a third sensor that is disposed in a shadow of the optical path to provide the co-axial three channel images. Moreover, the beam splitters used in the optical system serve as powered elements providing both the splitting and correction functions. The optical system is configured to use in multiple wavelengths and multiple sensor scenarios.

The terms "aperture", "single aperture", "common aperture" and "source aperture" are being used interchangeably throughout the document.

Figure 1:
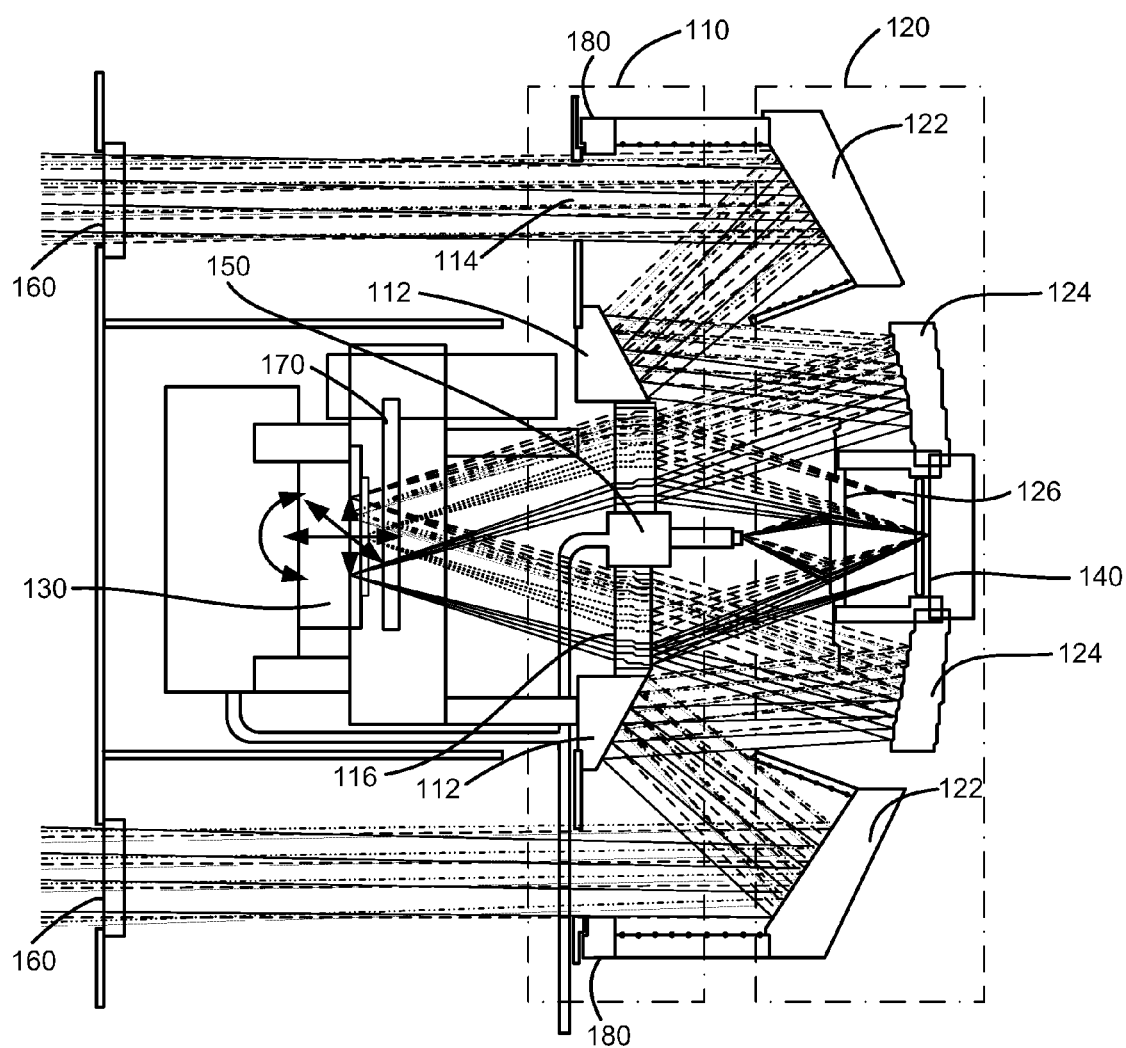
FIG. 1 is a schematic diagram of a single aperture coaxial three channel optical system, according to an embodiment of the present subject matter.

FIG. 1 illustrates an example single aperture coaxial three channel optical system 100, according to an embodiment of the present subject matter. As shown in FIG. 1, the single aperture coaxial three channel optical system 100 includes a front optical group 110 including a source aperture 114, a secondary mirror 112 and a first beam splitter and corrector element 116. Example first beam splitter and corrector element 116 is an infrared (IR)/visible plus laser splitter and corrector element.

Also as shown in FIG. 1, the optical system 100 includes a back optical group 120 that is disposed in substantially close proximity to the front optical group 110. In some embodiments, disposing in substantially close proximity to the front optical group 110 is based on disposing the back optical group 120 about a third of focal length of the optical system 100. Further as shown in FIG. 1, the back optical group 120 includes a primary mirror 122, a tertiary mirror 124 and a second beam splitter and corrector element 126. Example second beam splitter and corrector element 126 is a visible/laser splitter and corrector element.

Furthermore as shown in FIG. 1, the optical system 100 includes a first sensor 130 that is disposed substantially close and to the left of the front optical group 110. In addition as shown in FIG. 1, the optical system 100 includes a second sensor 140 disposed substantially close and to the right of the back optical group 120. Moreover as shown in FIG. 1, the optical system 100 includes a third sensor 150 disposed on the first beam splitter and corrector element 116 and in a shadow of optical path. Example first sensor 130, the second sensor 140 and the third sensor 150 are IR sensor, visible sensor and laser sensor, respectively. FIG. 1 also shows a shutter and motor assembly 170 disposed substantially in front of the first sensor 130.

In operation, the primary mirror 122, the secondary minor 112 and the tertiary minor 124 are configured to receive an object beam via the source aperture 114 and focus the object beam on to the first beam splitter and corrector element 116. Further in operation, the first beam splitter and corrector element 116 is configured to split the object beam into a reflected beam having first wavelengths and a transmitted beam of second wavelengths. Furthermore in operation, the second beam splitter and corrector element 126 is configured to receive and split the reflected beam having first wavelengths into a transmitted beam having third wavelengths and a reflected beam having fourth wavelengths. Example reflected beam of first wavelengths is light of visible wavelength of up to 8 microns. Example transmitted beam of second wavelengths is light of infra red (IR) wavelengths above 8 microns. Example transmitted beam of third wavelengths is light of wavelength equal to or below 1 micron. Example reflected beam of fourth wavelengths is light of wavelengths between 1 micron and 8 microns (i.e., wavelengths not transmitted by the first beam splitter and corrector element 116 and the second beam splitter and corrector element 126).

Further in operation, the first sensor 130, the second sensor 140 and the third sensor 150 are configured to receive the transmitted beam of second wavelengths, the transmitted beam of third wavelengths, and the reflected beam of fourth wavelengths, respectively and produce the coaxial three channel images. Example coaxial three channel images are IR image, visible image and laser image.

In some embodiments, a multispectral window 160 is disposed substantially in front of the source aperture 114 or integral with front optical group 110 to protect the source aperture 114 and the front optical group 110 and the back optical group 120 from elements of the natural environment.

Figure 2:
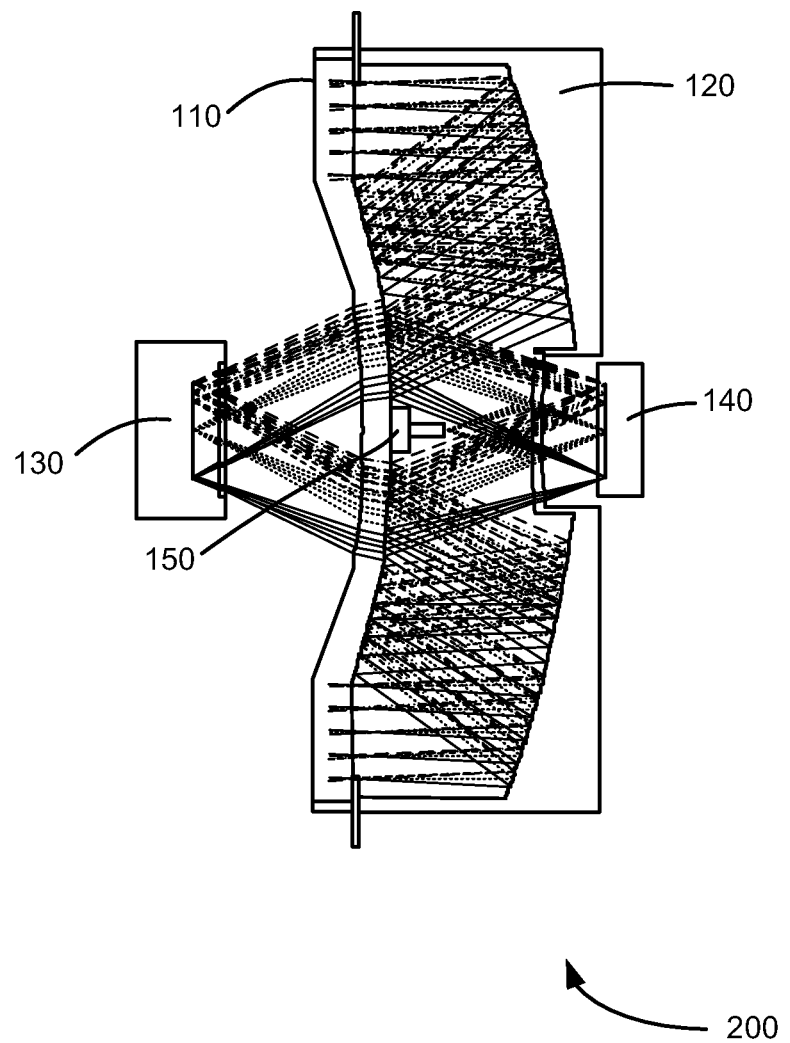
FIG. 2 illustrates an example fabricated single aperture coaxial three channel optical system, according to an embodiment of the present subject matter.
Figure 3:
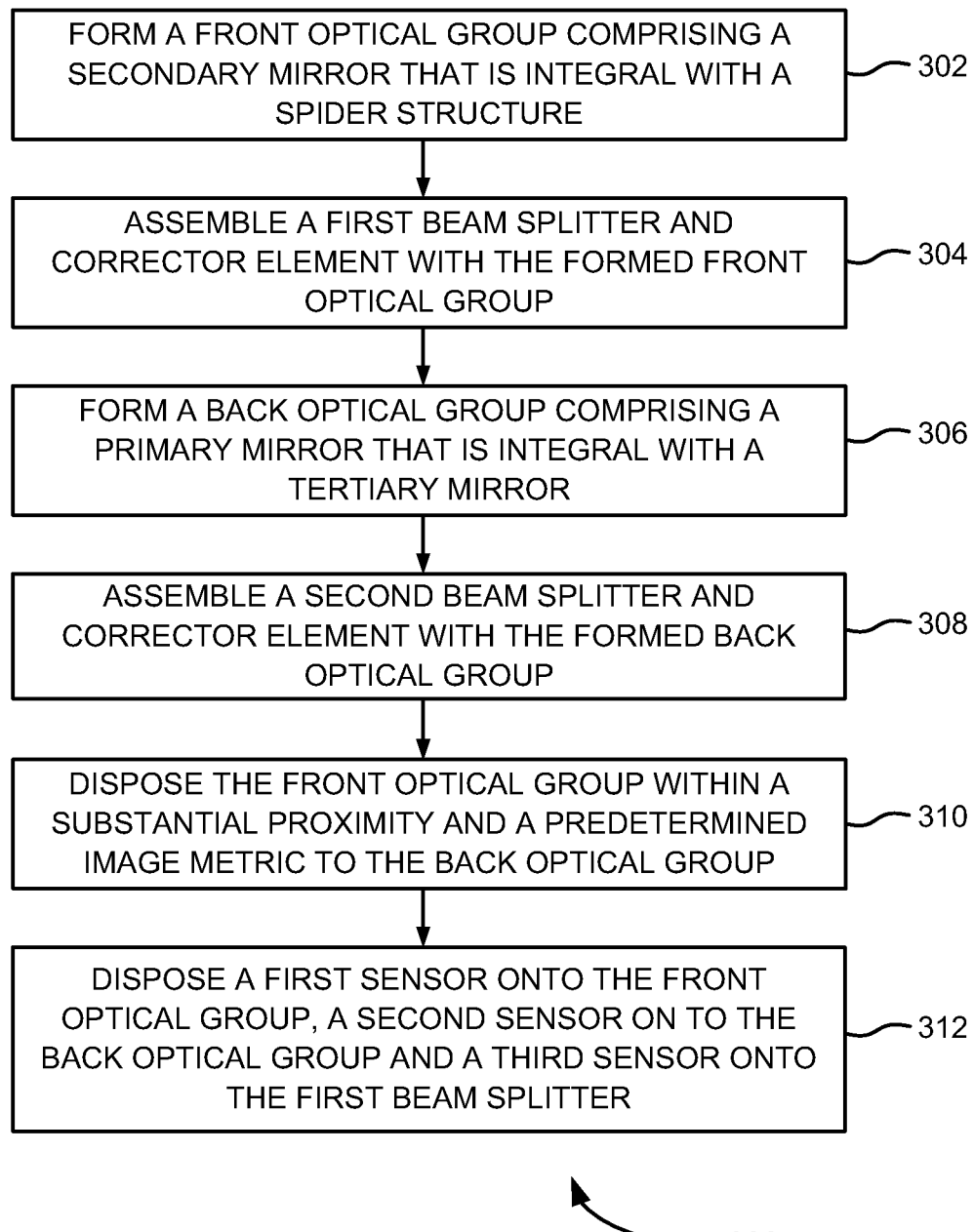
FIG. 3 is a flow diagram of a process of fabricating a single aperture coaxial three channel optical system, such as those shown in FIG. 1, for producing coaxial three channel images, according to an example embodiment.

FIG. 3 is a flow diagram of a process 300 of fabricating a single aperture coaxial three channel optical system for producing coaxial three channel images, according to an example embodiment. FIG. 3 illustrates the process 300 to build a compact single aperture coaxial three channel optical system, such as those shown in FIGS. 1-2.

At block 302, the process 300 forms a front optical group including a secondary minor that is integral with a spider structure 180 (shown in FIG. 1). The spider structure integrates and supports a multispectral window and a source aperture. FIG. 2 shows an example embodiment of fabricating the first optical group into a single piece 120, which includes the secondary minor and the spider structure including the multispectral widow and the source aperture. In some embodiments, the multispectral window is made of cleartran material. At block 304, a first beam splitter and corrector element is assembled into the formed front optical group. The first beam splitter corrector element is configured to split an object beam into a reflected beam having first wavelengths and a transmitted beam of second wavelengths.

At block 306 a back optical group is formed including a primary minor that is integral with a tertiary minor. FIG. 2 shows an example embodiment of formed primary minor that is integral with the tertiary minor 120. At block 308 a second beam splitter and corrector element is assembled into the formed back optical group. The second beam splitter and corrector element is configured to receive and split the reflected beam having first wavelengths into a transmitted beam having third wavelengths and a reflected beam having fourth wavelengths.

At block 310, the front optical group is disposed within a substantial proximity and a predetermined image metric to the back optical group. In some embodiments, the back optical group can have a reference surface that extends towards the front optical group so that the back optical group may be disposed accurately within a desired image metric. In these embodiments, the optical components in each of the front optical group and the back optical group are disposed to a desired relationship with each other to achieve the coaxial three channel images. Further in these embodiments, the front optical group is disposed to a desired optical tolerance with the back optical group.

At block 312, a first sensor is disposed onto the front optical group, a second sensor is disposed on to the back optical group and a third sensor is disposed onto the first beam splitter and corrector element such that they are within a predetermined boresight and image metric to receive the transmitted beam of second wavelengths, the transmitted beam of third wavelengths, and the reflected beam of fourth wavelengths, respectively, and to produce the coaxial three channel images. In these embodiments, the first sensor, the second sensor and the third sensor are aligned to obtain a desired boresight and image metric. In some embodiments, the third sensor is installed first and then this third sensor becomes the reference to align and assemble the first sensor and the second sensor. In some embodiments, after disposing the first sensor, the second sensor and the third sensor, a desired boresight metric is obtained using electronic calibration either in hardware or software and/or a combination of both.

Even though the above technique describes providing coaxial three channel images, one can skilled in the art can imagine that by having a third beam splitter and corrector element instead of a tertiary minor in the example embodiment shown in FIGS. 1-2, and further having needed optics and sensors to the right of the tertiary minor can provide a coaxial fourth channel image.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A single aperture coaxial three channel optical system, comprising:
    a front optical group comprising a source aperture, secondary mirror and a first beam splitter and corrector element;
    a back optical group that is disposed in substantially close proximity to the front optical group, wherein the back optical group comprising a primary mirror, a tertiary mirror and a second beam splitter and corrector element;
    a first sensor disposed substantially close and to the left of the front optical group;
    a second sensor disposed substantially close and to the right of the back optical group; and
    a third sensor disposed in the first beam splitter and corrector element and in a shadow of optical path, wherein the primary minor, the secondary mirror and the tertiary mirror are configured to receive an object beam and focus the object beam on to the first beam splitter and corrector element, wherein the first beam splitter corrector element is configured to split the object beam into a reflected beam having first wavelengths and a transmitted beam of second wavelengths, wherein the second beam splitter and corrector element is configured to receive and split the reflected beam having first wavelengths into a transmitted beam having third wavelengths and a reflected beam having fourth wavelengths, and wherein the first sensor, the second sensor and the third sensor are configured to receive the transmitted beam of second wavelengths, the transmitted beam of third wavelengths, and the reflected beam of fourth wavelengths, respectively and produce coaxial three channel images.

2. The optical system of claim 1, wherein the first beam splitter and corrector element is an infrared (IR)/visible plus laser splitter and corrector element.

3. The optical system of claim 1, wherein the second beam splitter and corrector element is a visible/laser splitter and corrector element.

4. The optical system of claim 1, wherein the first sensor, the second sensor and the third sensor are IR sensor, visible sensor and laser sensor, respectively.

5. The optical system of claim 1, wherein the reflected beam of first wavelengths is light of visible wavelength of up to 8 microns.

6. The optical system of claim 1, wherein the transmitted beam of second wavelengths is light of infra red (IR) wavelengths above 8 microns.

7. The optical system of claim 1, wherein the transmitted beam of third wavelengths is light of wavelength equal to or below 1 micron.

8. The optical system of claim 1, wherein the reflected beam of fourth wavelengths is light of wavelength between 1 micron and 8 microns.

9. The optical system of claim 1, wherein the three coaxial channel images are IR image, visible image and laser image.

10. The optical system of claim 1, further comprising:
    a multispectral window disposed substantially in front of the source aperture to protect the source aperture and the front optical group and the back optical group from elements.

11. A method of fabricating a single aperture coaxial three channel optical system for producing coaxial three channel images, the method comprising:
    forming a front optical group comprising a secondary mirror that is integral with a spider structure, wherein the spider structure to integrate and support a multispectral window and a source aperture;
    assembling a first beam splitter and corrector element with the formed front optical group, wherein the first beam splitter corrector element is configured to split an object beam into a reflected beam having first wavelengths and a transmitted beam of second wavelengths;
    forming a back optical group comprising a primary mirror that is integral with a tertiary mirror, wherein the primary mirror, the secondary mirror and the tertiary mirror are configured to receive the object beam and focus the object beam on to the first beam splitter and corrector element;
    assembling a second beam splitter and corrector element with the formed back optical group, wherein the second beam splitter and corrector element is configured to receive and split the reflected beam having first wavelengths into a transmitted beam having third wavelengths and a reflected beam having fourth wavelengths;
    disposing the front optical group within a substantial proximity and a predetermined image metric to the back optical group; and
    disposing a first sensor onto the front optical group, a second sensor on to the back optical group and a third sensor onto the first beam splitter and corrector element such that they are within a predetermined boresight and image metric to receive the transmitted beam of second wavelengths, the transmitted beam of third wavelengths, and the reflected beam of fourth wavelengths, respectively, and to produce the coaxial three channel images.

12. The method of claim 11, wherein the first beam splitter and corrector element is an infrared (IR)/visible plus laser splitter and corrector element.

13. The method of claim 11, wherein the second beam splitter and corrector element is a visible/laser splitter and corrector element.

14. The method of claim 11, wherein the first sensor, the second sensor and the third sensor are IR sensor, visible sensor and laser sensor, respectively.

15. The method of claim 11, wherein the first wavelengths is light of visible wavelength of up to 8 microns.

16. The method of claim 11, wherein the second wavelengths is light of infra red (IR) wavelengths above 8 microns.

17. The method of claim 11, wherein the third wavelengths is light of wavelength equal. to or below 1 micron.

18. The method of claim 11, wherein the fourth wavelengths is light of wavelength between 1 micron and 8 microns.

19. The method of claim 11, wherein the three coaxial channel images are IR image, visible image and laser image.

* * * * *